United States Patent
Kumar et al.

(10) Patent No.: US 12,033,097 B2
(45) Date of Patent: Jul. 9, 2024

(54) UTILIZING MACHINE LEARNING AND PREDICTIVE MODELING TO MANAGE AND DETERMINE A PREDICTED SUCCESS RATE OF NEW PRODUCT DEVELOPMENT

(71) Applicant: Accenture Global Solutions Limited, Dublin (IE)

(72) Inventors: Amit Kumar, Gurgaon (IN); Piyush Manocha, New Delhi (IN); Anshul Gupta, Delhi (IN); Nishant Mehta, Delhi (IN); Anshul Anand, Uttar Pradesh (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/947,551

(22) Filed: Aug. 6, 2020

(65) Prior Publication Data
US 2022/0044174 A1    Feb. 10, 2022

(51) Int. Cl.
*G06Q 10/0631* (2023.01)
*G06N 20/00* (2019.01)
(Continued)

(52) U.S. Cl.
CPC ....... *G06Q 10/06313* (2013.01); *G06N 20/00* (2019.01); *G06Q 10/0631* (2013.01);
(Continued)

(58) Field of Classification Search
CPC ......... G06Q 10/06313; G06Q 10/0637; G06Q 10/0631; G06Q 30/0205; G06Q 30/0202; G06Q 10/067; G06N 20/00
See application file for complete search history.

(56) References Cited

U.S. PATENT DOCUMENTS 7,730,002 B2 * 6/2010 Afeyan ............... G06N 7/01
706/45
8,214,238 B1 * 7/2012 Fairfield ............ G06Q 30/0203
705/7.29
(Continued)

FOREIGN PATENT DOCUMENTS

GB       2521749 A  *  7/2015  ........... G06Q 10/067
JP    2012146126 A     8/2012
(Continued)

OTHER PUBLICATIONS

P. Ongsulee, et al., "Big Data, Predictive Analytics and Machine Learning," 2018 16th International Conference on ICT and Knowledge Engineering (ICT&KE), 2018, pp. 1-6, doi: 10.1109/ICTKE.2018.8612393. (Year: 2018).*
(Continued)

*Primary Examiner* — Crystol Stewart
(74) *Attorney, Agent, or Firm* — Polsinelli PC

(57) ABSTRACT

A new product development system may provide, to one or more client devices and server devices, one or more tools to enable development of a new product. The new product development system may receive current project data identifying a current project for developing the new product, historical project data identifying historical projects for developing historical products, and industry data associated with the new product. The new product development system may process the current project data, the historical project data, and the industry data, with a machine learning model, to identify one or more variables for a predictive model and may process the one or more variables, with the predictive model, to predict a predicted success rate of the current project. The new product development system may perform one or more actions based on the predicted success rate of the current project.

20 Claims, 9 Drawing Sheets

(51) Int. Cl.
   *G06Q 10/0637* (2023.01)
   *G06Q 10/067* (2023.01)
   *G06Q 30/0202* (2023.01)
   *G06Q 30/0204* (2023.01)

(52) U.S. Cl.
   CPC ....... *G06Q 10/0637* (2013.01); *G06Q 10/067* (2013.01); *G06Q 30/0202* (2013.01); *G06Q 30/0205* (2013.01)

(56) References Cited

U.S. PATENT DOCUMENTS

| | | | | |
|---|---|---|---|---|
| 9,043,745 | B1* | 5/2015 | Diskin | G06Q 10/06 |
| | | | | 717/102 |
| 10,325,223 | B1* | 6/2019 | Arel | G06N 3/0445 |
| 10,554,817 | B1* | 2/2020 | Sullivan | H04L 41/5054 |
| 10,599,992 | B1* | 3/2020 | Cohen | G06N 5/02 |
| 10,984,433 | B1* | 4/2021 | Doner | G06Q 50/06 |
| 11,468,379 | B2 | 10/2022 | Bailey et al. | |
| 2002/0107819 | A1* | 8/2002 | Ouimet | G06Q 10/06375 |
| | | | | 705/400 |
| 2003/0225601 | A1* | 12/2003 | Hayden | G06Q 10/0635 |
| | | | | 705/7.29 |
| 2007/0288602 | A1* | 12/2007 | Sundaresan | G06Q 30/06 |
| | | | | 709/219 |
| 2008/0312979 | A1* | 12/2008 | Lee | G06Q 10/0635 |
| | | | | 705/7.39 |
| 2009/0043719 | A1* | 2/2009 | Hall | G06N 7/005 |
| | | | | 706/13 |
| 2009/0222311 | A1* | 9/2009 | Cao | G06Q 30/0206 |
| | | | | 705/400 |
| 2010/0010870 | A1* | 1/2010 | Millar | G06Q 30/0202 |
| | | | | 705/7.31 |
| 2011/0191141 | A1* | 8/2011 | Thompson | G06Q 30/0202 |
| | | | | 705/7.32 |
| 2013/0179219 | A1* | 7/2013 | Ross | G06Q 30/0202 |
| | | | | 705/7.31 |
| 2014/0330646 | A1* | 11/2014 | Mierle | G06Q 30/0256 |
| | | | | 705/14.54 |
| 2014/0344020 | A1* | 11/2014 | Thalken | G06Q 30/0206 |
| | | | | 705/7.35 |
| 2016/0171534 | A1* | 6/2016 | Linden | G06Q 30/0255 |
| | | | | 705/14.53 |
| 2018/0101771 | A1* | 4/2018 | Schwarm | G06Q 10/10 |
| 2018/0144351 | A1* | 5/2018 | Gregory | G06Q 30/0202 |
| 2018/0247322 | A1* | 8/2018 | He | G06Q 30/0202 |
| 2018/0341898 | A1* | 11/2018 | Bose | G06Q 30/0202 |
| 2019/0213551 | A1* | 7/2019 | Zhou | G06Q 10/06313 |
| 2019/0213660 | A1* | 7/2019 | Astrada | G06Q 40/02 |
| 2019/0340516 | A1* | 11/2019 | Kumar | G06Q 10/0635 |
| 2019/0378048 | A1* | 12/2019 | Shrivastava | G06N 5/022 |
| 2020/0311749 | A1* | 10/2020 | Sridharan | G06Q 30/0202 |
| 2021/0056473 | A1* | 2/2021 | Jawahir | G06Q 10/067 |
| 2021/0103943 | A1* | 4/2021 | Bower | G06Q 30/0643 |
| 2021/0390424 | A1* | 12/2021 | Vo | G06N 20/00 |

FOREIGN PATENT DOCUMENTS

| | | |
|---|---|---|
| JP | 2019028871 A | 2/2019 |
| JP | 2020091843 A | 6/2020 |

OTHER PUBLICATIONS

Choi et al., Production Volume Calculating Method, Device, System and Program, and Recording Medium, 2002, Japan Patent Office, JP2004102357A, Machine Translation (Year: 2002).*

M. Better, F. Glover and M. Laguna, "Advances in analytics: Integrating dynamic data mining with simulation optimization," in IBM Journal of Research and Development, vol. 51, No. 3.4, pp. 477-487, May 2007, doi: 10.1147/rd.513.0477. (Year: 2007).*

* cited by examiner

UTILIZING MACHINE LEARNING AND PREDICTIVE MODELING TO MANAGE AND DETERMINE A PREDICTED SUCCESS RATE OF NEW PRODUCT DEVELOPMENT

BACKGROUND

Developing and launching a new product requires coordination between many different departments, such as a research and development (R&D) department, a procurement department, a manufacturing department, a marketing department, and/or the like. This also requires making estimations about a complexity of developing the new product, a timeline for developing the new product, a quantity and type of resources needed to produce the new product, current and forecasted demand for the new product, and/or the like. To effectively coordinate the departments and make the estimations, a team leader must make judgments concerning one or more characteristics of a project to develop and launch the new product.

SUMMARY

In some implementations, a method includes providing, by a device and to one or more client devices and server devices, one or more tools to enable development of a new product via the one or more client devices and server devices; receiving, by the device and from the one or more tools, current project data identifying a current project for developing the new product; receiving, by the device, historical project data identifying historical projects for developing historical products; receiving, by the device, industry data identifying one or more of: industry trends associated with the new product, market intelligence associated with the new product, crowdsourced ideas associated with the new product, or potential customers associated with the new product; processing, by the device, the current project data, the historical project data, and the industry data, with a machine learning model, to identify one or more variables for a predictive model, wherein the one or more variables include one or more of: a quantity of historical projects of an entity associated with developing the new product and that developed the historical products, a quantity of industry projects identified in the industry data, relevancy factors indicating relevancies between the current project and the historical projects and indicating relevancies between the current project and the industry projects, recency factors indicating how recent the historical projects are, compared to the current project and indicating how recent the industry projects are, compared to the current project, success rates of the historical projects and the industry projects, or percent deviations from an initial objective defined for the current project, from an initial cost defined for the current project, and from an initial timeline defined for the current project; processing, by the device, the one or more variables, with the predictive model, to predict a predicted success rate of the current project; and performing, by the device, one or more actions based on the predicted success rate of the current project.

In some implementations, a device includes one or more memories; and one or more processors, communicatively coupled to the one or more memories, configured to: provide, to one or more client devices and server devices, one or more tools to enable development of a new product via the one or more client devices and server devices; receive, from the one or more tools, current project data identifying a current project for developing the new product; receive historical project data identifying historical projects for developing historical products; receive industry data associated with the new product; process the current project data, the historical project data, and the industry data, with a machine learning model, to identify one or more variables for a predictive model, wherein the machine learning model is trained based on: prior project data identifying a prior project for developing a prior product, the historical project data, and particular industry data associated with the prior product; process the one or more variables, with the predictive model, to predict a predicted success rate of the current project; and perform one or more actions based on the predicted success rate of the current project.

In some implementations, a non-transitory computer-readable medium storing instructions includes one or more instructions that, when executed by one or more processors, cause the one or more processors to: provide, to one or more client devices and server devices, one or more tools to enable development of a new product via the one or more client devices and server devices; receive, from the one or more tools, current project data identifying a current project for developing the new product; receive historical project data identifying historical projects for developing historical products; receive industry data associated with the new product; process the current project data, the historical project data, and the industry data, with a machine learning model, to identify one or more variables for a predictive model; process the one or more variables, with the predictive model, to predict a predicted success rate of the current project; and perform one or more actions based on the predicted success rate of the current project.

DETAILED DESCRIPTION

Figure 1A:
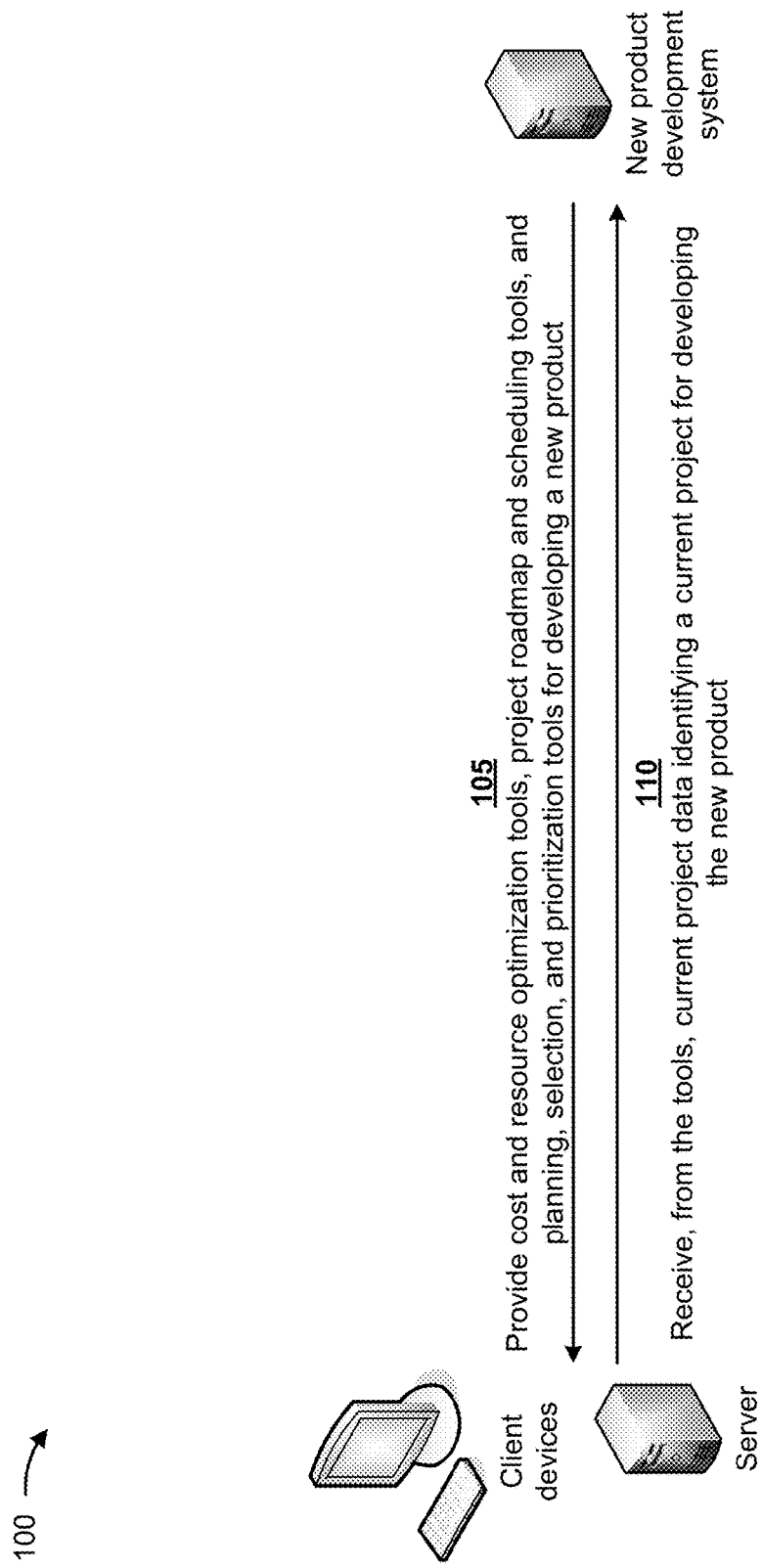
FIGS. 1A-1E are diagrams of an example implementation described herein.

The following detailed description of example implementations refers to the accompanying drawings. The same reference numbers in different drawings may identify the same or similar elements.

Typically, new product development is a linear process, where an R&D department works on designing a new product, a procurement department works on procuring materials to manufacture the new product after the new product is designed by the R&D department, a manufacturing department works on manufacturing the new product after the materials are procured, a marketing department works on marketing the new product after the new product is manufactured, and so on. However, this is a time consuming process, and the linear nature of the process may increase a time to market for the new product when tasks of one or more of the departments are delayed. Moreover, managing a new product development project may be resource intensive, while also being prone to human error. For example, a project manager may use one or more computing resources to manage a status of the project, but may not have access or visibility to key data maintained by each department. Consequently, the project manager may make poor decisions that negatively impact development of the new product. This may lead to excessive use of computing resources to address issues resulting from the poor decisions (e.g., to redesign certain aspects of the new product, change an order to procure materials to manufacture the new product, update marketing materials based on a changing performance of the new product, and/or the like).

Some implementations described herein provide a new product development system that streamlines the new product development process. In some implementations, the new product development system may provide tools to client devices and/or server devices associated with each department associated with a project to develop a new product. The tools may collect and provide current project data to the new product development system so that the new product development system has up-to-date visibility on the development status of the new product across all departments.

In some implementations, the new product development system may obtain historical data associated with historical projects (e.g., that are similar to the project to develop the new product) and/or industry data associated with the new product. The new product development system may use a machine learning model on the current project data, the historical data, and/or the industry data to determine one or more variables for a predictive model. The new product development system then may determine, using the predictive model, a predicted success rate of the current project based on the one or more variables. Accordingly, the new product development system may perform one or more actions based on the predicted success rate, such as automatically causing a change to be implemented for the current project (e.g., a change in a timeline of the current project, a change to an ordering date and/or quantity for manufacturing materials, and/or the like).

In this way, relative to previous techniques, the new product development system reduces a likelihood of incorrectly managing a new product development project. Correspondingly, the new product development system conserves computing resources, networking resources, and/or the like that would otherwise be wasted implementing an incorrect or suboptimal new product development plan, identifying an incorrect or suboptimal new product development plan, revising an incorrect or suboptimal new product development plan, delaying completion or release of the new product due to an incorrect or suboptimal new product development plan, and/or the like. The new product development system may also improve overall performance of devices associated with the current project due to efficient and effective allocation of resources for monitoring and/or analyzing the current project.

Furthermore, the new product development system may improve a scalability of projects to develop new products (e.g., the new product development system can be configured to manage larger projects or multiple projects, additional aspects of a project, and/or the like without a delay associated with hiring additional project managers and/or computing resource utilization associated with providing computing resources for the project managers). Additionally, the new product development system may handle thousands, millions, billions, and/or the like, of predicted success rates for new product development projects within a period of time (e.g., daily, weekly, monthly), and thus may provide "big data" capability.

FIGS. 1A-1E are diagrams of an example 100 associated with utilizing machine learning models and predictive modeling to manage and determine a predicted success rate of new product development. As shown in FIGS. 1A-1E, example 100 includes one or more client devices, one or more server devices, and a new product development system. In some implementations, the one or more client devices, the one or more server devices, and/or the new product development system may be connected via a network, such as a wired network (e.g., the Internet or another data network), a wireless network (e.g., a wireless local area network, a wireless wide area network, a cellular network, and/or the like), and/or the like.

The new product development system may include a computing device, a server device, a cloud computing device, and/or the like. A client device, of the one or more client devices, may include a communication and/or computing device, such as a mobile phone, a smartphone, a laptop computer, a tablet computer, and/or the like. A server device, of the one or more server devices, may include a communication and/or computing device, such as a server, a web server, a server in a cloud computing environment, and/or the like.

As shown in FIG. 1A, and by reference number 105, the new product development system may provide to the one or more client devices and/or the one or more server devices one or more tools. The one or more client devices and/or the one or more server devices may use the one or more tools to develop (or to aid in developing) a new product, such as a new software product, a new pharmaceutical product, a new manufacturing product, and/or the like. In some implementations, the new product development system may establish (or cause to be established) at least one communication link with the one or more client devices and/or the one or more server devices and may send the one or more tools to the one or more client devices and the one or more server devices via the communication link.

The one or more tools may include cost and resource optimization tools; project roadmap and scheduling tools; planning, selection, and prioritization tools; and/or the like for developing the new product. In some implementations, the one or more tools may include a cross-process linkage tool, a scenario modeling tool, a benchmarking tool, a what if workflow tool, a budget simulation tool, an alarm generation tool, a reporting tool, a bottleneck identification tool, a root cause analysis tool, and/or the like. The one or more client devices and/or the one or more server devices may use the one or more tools to facilitate developing, planning, designing, prototyping, testing, launching (e.g., pilot launching), and/or the like, the new product.

As further shown in FIG. 1A, and by reference number 110, the new product development system may receive, from the one or more tools, current project data identifying a current project for developing the new product. The current project data may include concept development data associated with the new product; planning data associated with the new product; design data associated with the new product; prototyping data associated with the new product; testing data associated with the new product; pilot launch data associated with the new product; and/or the like. In some implementations, at least one of the one or more client devices and/or the one or more server devices (e.g., that are using the one or more tools) may send the current project data to the new product development system (e.g., via the at least one communication link) on a scheduled basis (e.g., every hour, every day, every week, and/or the like), on an on-demand basis (e.g., based on a request from the new product development system), on a triggered basis (e.g., after completing a particular milestone event associated with developing the new product), and/or the like.

Figure 1B:
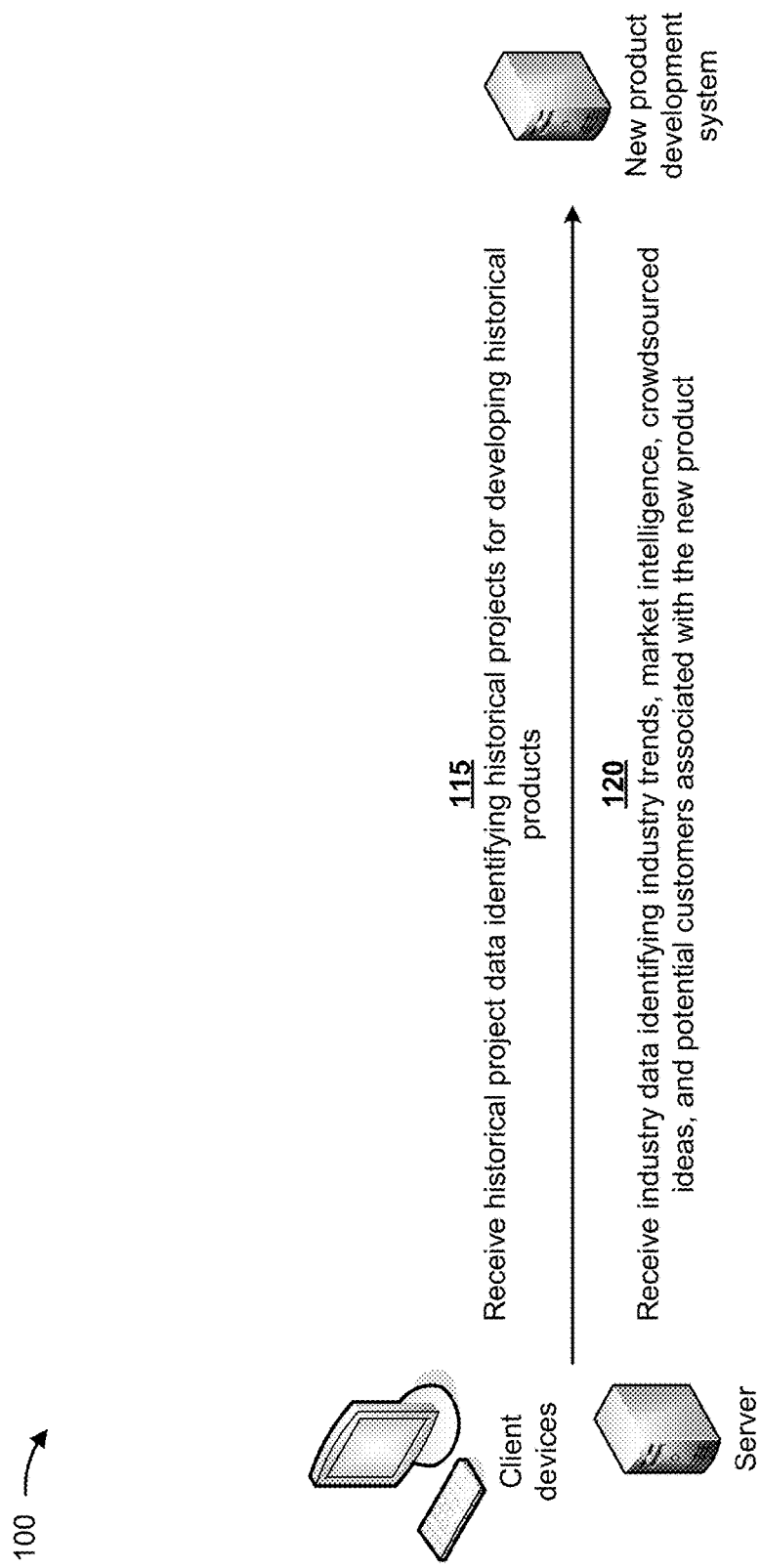

As shown in FIG. 1B, and by reference number 115, the new product development system may receive historical project data identifying historical projects for developing historical products. The historical project data may include historical project data of an entity (e.g., a company, an organization, a university, and/or the like) associated with developing the new product and that developed the historical products. The historical project data may identify, for a historical project for developing a historical product, concept development data associated with the historical product; planning data associated with the historical product; design data associated with the historical product; prototyping data associated with the historical product; testing data associated with the historical product; pilot launch data associated with the historical product; and/or the like. In some implementations, at least one of the one or more client devices and/or the one or more server devices (e.g., that are using the one or more tools) may send the historical project data to the new product development system (e.g., via the at least one communication link).

As further shown in FIG. 1B, and by reference number 120, the new product development system may receive industry data associated with the new product. The industry data may identify industry trends associated with the new product, market intelligence associated with the new product, crowdsourced ideas associated with the new product, potential customers associated with the new product, and/or the like. In some implementations, at least one of the one or more client devices and/or the one or more server devices (e.g., that are using the one or more tools) may send the industry data to the new product development system (e.g., via the at least one communication link).

Figure 1C:
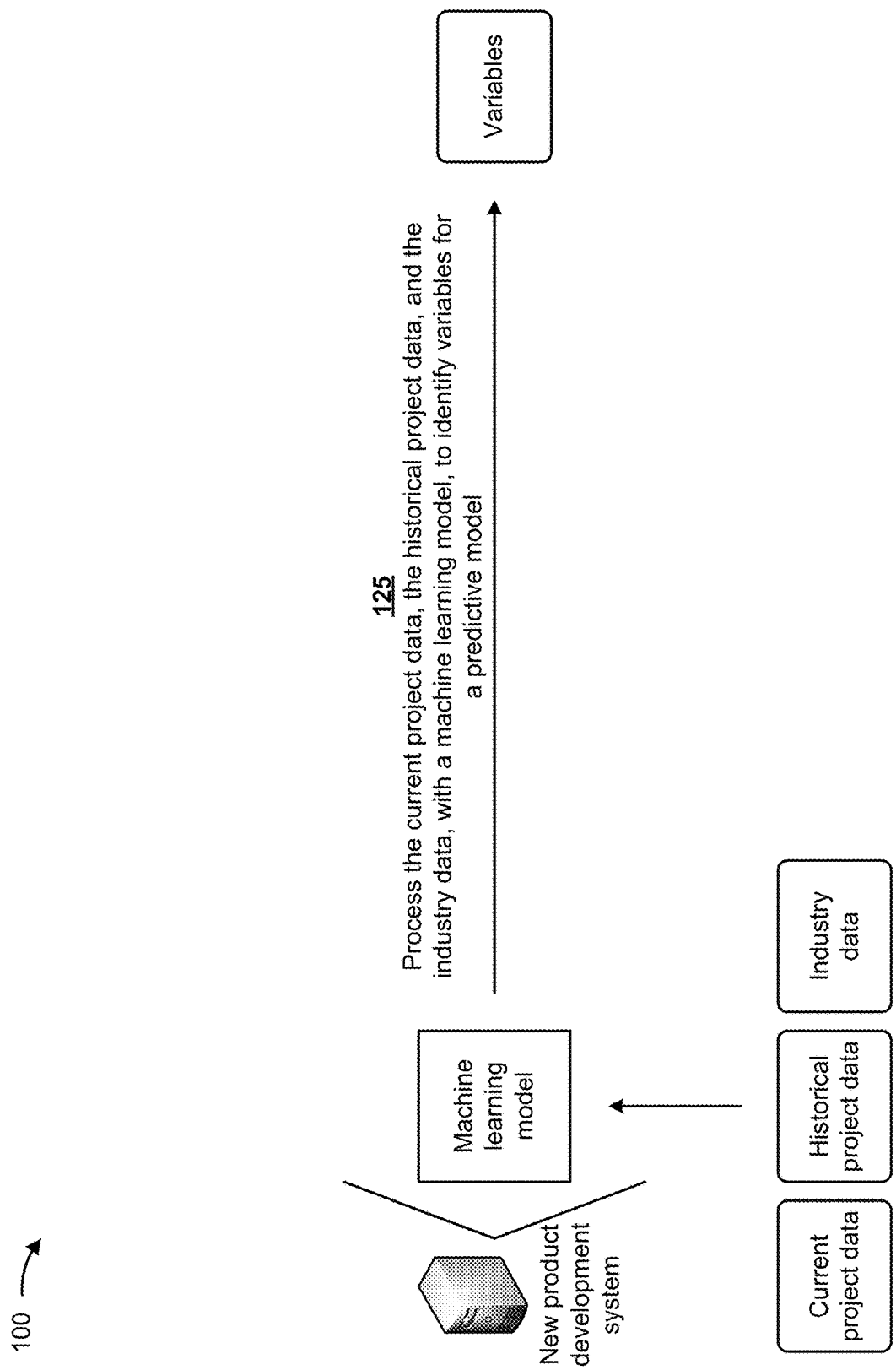

As shown in FIG. 1C, and by reference number 125, the new product development system may process the current project data, the historical project data, and/or the industry data to identify one or more variables for a predictive model. The one or more variables may include a quantity of historical projects of the entity associated with developing the new product and/or that developed the historical products; a quantity of industry projects identified in the industry data; relevancy factors indicating relevancies between the current project and the historical projects and/or indicating relevancies between the current project and the industry projects; recency factors indicating how recent the historical projects are, compared to the current project and/or indicating how recent the industry projects are, compared to the current project; success rates of the historical projects and/or the industry projects; percent deviations from an initial objective defined for the current project, from an initial cost defined for the current project, and/or from an initial timeline defined for the current project; and/or the like.

In some implementations, the new product development system may use a machine learning model (e.g., may process the current project data, the historical project data, and/or the industry data using the machine learning model) to identify the one or more variables for the predictive model. In some implementations, the machine learning model may have been trained (e.g., by the new product development system) based on prior project data identifying a prior project for developing a prior product, the historical project data, particular industry data associated with the prior product, and/or the like. Using the prior project data, the historical project data, and the particular industry data as inputs to the machine learning model, the machine learning model may be trained to identify one or more relationships (e.g., between respective elements of the prior project data, the historical project data, and the particular industry data) for determining the one or more variables for the predictive model. The machine learning model may be trained and/or used in a similar manner to that described below with respect to FIG. 2.

Figure 1D:
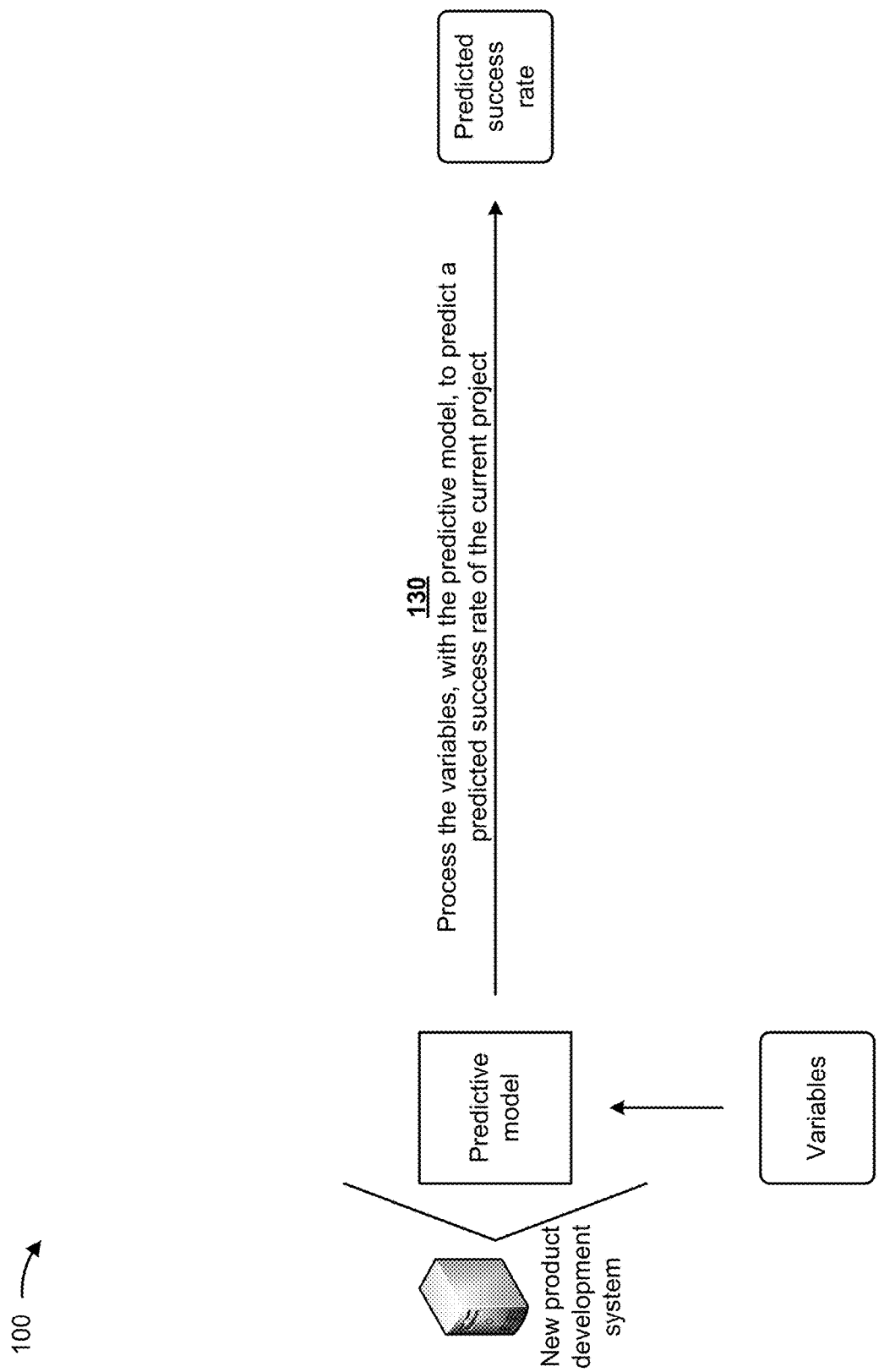

As shown in FIG. 1D, and by reference number 130, the new product development system may process the one or more variables with the predictive model to predict a predicted success rate of the current project. The predictive model may include a formula, an algorithm, and/or the like, to predict the predicted success rate of the current project. For example, the new product development system may determine an average (e.g., a mean, a median, a weighted averaged, and/or the like) of the one or more variables to predict the predicted success rate of the current project. As another example, the new product development system may use a formula of the following form to predict the predicted success rate of the current project:

$$\text{Predicted Success Rate of Current Project } k = \max\left(\left(\min\left(\left(\sum_{i=1}^{n} a_i b_i X_i + \sum_{j=1}^{m} a_j b_j W_j\right), 1\right)\right) - (O_k + Y_k + Z_k)\right), 0\right)$$

where n=the quantity of historical projects of the entity associated with developing the new product and/or that developed the historical products, i is a counter and i=1 to n, n≥1; m=the quantity of industry projects identified in the industry data, j is a counter and j=1 to m, m≥1; k=the current project; a=the relevancy factors indicating relevancies between the current project and the historical projects and/or indicating relevancies between the current project and the industry projects (e.g., where 0≤a≤1). For example, a relevancy factor may be a combination of one or more values, such as values associated with applicable industries, applicable business units, applicable product lines, applicable scales of projects, applicable objectives/impacts of projects, applicable customer segments, applicable competition, and/or the like. b=recency factors indicating how recent the historical projects are, compared to the current project and/or indicating how recent the industry projects are, compared to the current project (e.g., where 0≤b≤1). For example, a recency factor may be 80-100% for 0-0.5 year-old projects, 60-79% for 0.5-1 year-old projects, 40-59% for 1-2 year-old projects, 20-39% for 2-4 year-old projects, and/or 0-19% for greater than 4 year-old projects. X=success rates of the historical projects and W=success rates of the industry projects, where X, W=(αP−βQ−γR), where P=percent achieved of an initial objective defined for the current project (e.g., where P=0% when the current project is a failure), Q=percent deviation from an initial cost defined for the current project, R=percent deviation from an initial timeline defined for the current project, α=weight assigned to the achievement of the initial objective, β=weight assigned to the deviation from the initial cost, and γ=weight assigned to the deviation from the initial timeline. O=percent deviation from the initial objective (e.g., where O=100% when the current project is a failure); Y=percent deviation from the initial cost; and Z=percent deviation from the initial timeline.

Figure 1E:
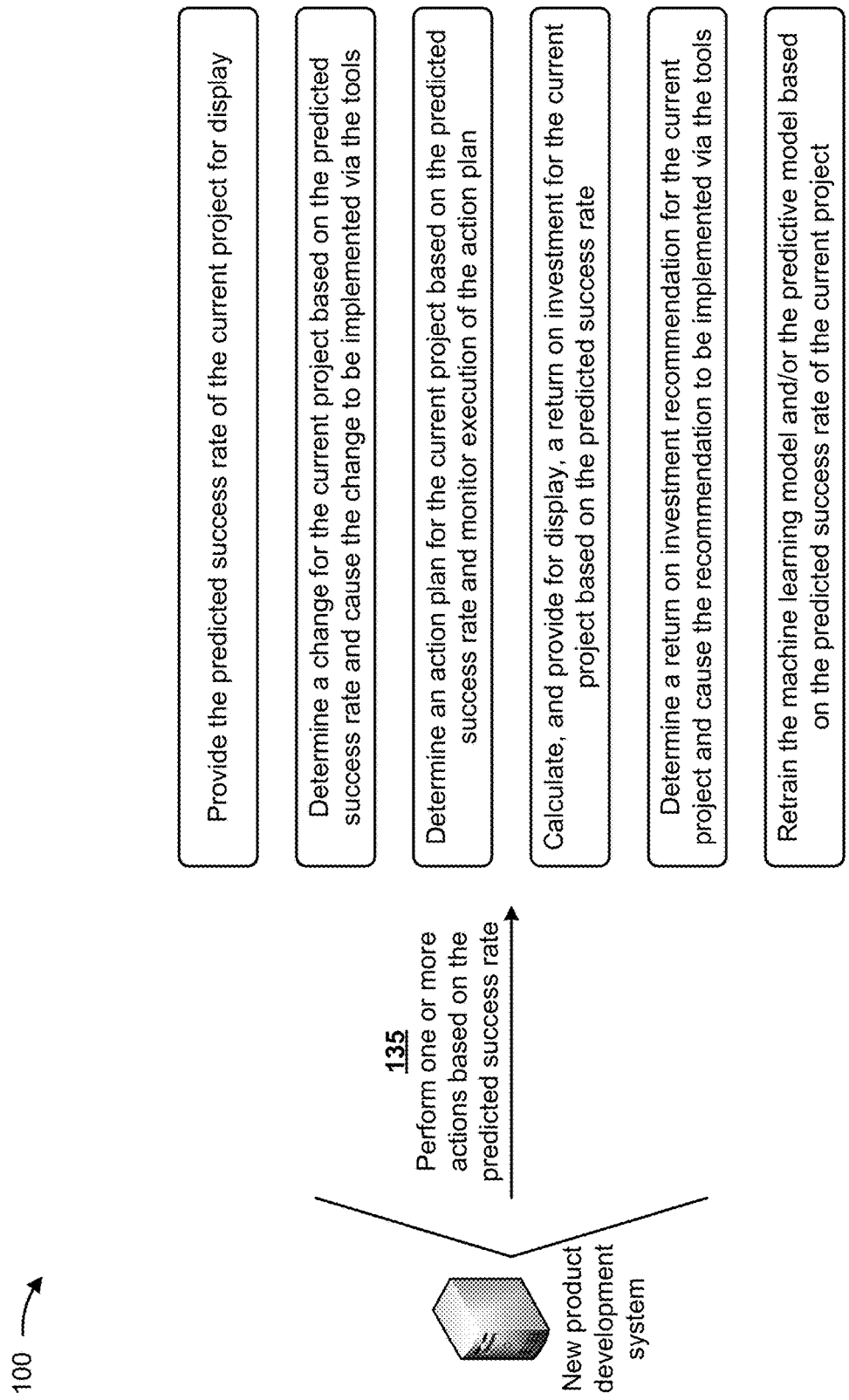

As shown in FIG. 1E, and by reference number 135, the new product development system may perform one or more actions based on the predicted success rate of the current project. In some implementations, the one or more actions may include the new product development system providing (e.g., via the communication link) information identifying the predicted success rate of the current project for display (e.g., on a display of at least one client device of the one or more client devices). In this way, the new product development system may alert individuals responsible for managing the current project, and the individuals may use the one or more tools (e.g., provided by the new product development system) to update and/or modify one or more aspects of the current project.

In some implementations, the one or more actions may include the new product development system determining a change for the current project based on the predicted success rate and/or causing the change to be implemented via the one or more tools. For example, the new product development system may generate, based on the predicted success rate, one or more instructions and provide (e.g., via the communication link) the one or more instructions to the one or more client devices and/or the one or more server devices. The one or more instructions may then be executed via the one or more tools to cause the change. In some implementations, the new product development system may monitor whether implementation of the change satisfies a compliance threshold, and generate and provide for display (e.g., on a display of a client device), an alarm message when implementation of the change fails to satisfy the compliance threshold. Additionally, or alternatively, the new product development system may determine an updated predicted success rate of the current project based on causing the change to be implemented, and perform one or more additional actions based on the updated predicted success rate of the current project. In this way, the new product development system may facilitate automatically optimizing and/or monitoring one or more aspects of the current project throughout the life cycle of the current project.

In some implementations, the one or more actions may include the new product development system causing implementation of the current project to cease (e.g., causing the current project to be shut down) or continue (e.g., causing the current project to continue unchanged) based on the predicted success rate. In some implementations, the one or more actions may include determining an action plan for the current project based on the predicted success rate and monitoring execution of the action plan. In this way, the new product development system may facilitate automatically optimizing one or more aspects of the current project at a particular moment in the life cycle of the current project.

In some implementations, the one or more actions include calculating, and providing for display (e.g., on a display of a client device), information identifying a return on investment for the current project based on the predicted success rate. Additionally, or alternatively, the new product development system may determine a return on investment recommendation for the current project based on the predicted success rate and cause the return on investment recommendation to be implemented via the one or more tools (e.g., in a similar manner as described above). In this way, the new product development system may facilitate automatically maximizing a return on investment of the current project during the life cycle of the current project.

In some implementations, the one or more actions include retraining the machine learning model based on the predicted success rate. In this way, the machine learning model may better predict one or more variables for the predictive model, which may produce more accurate predicted success rates and improve a performance of the new product development system.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
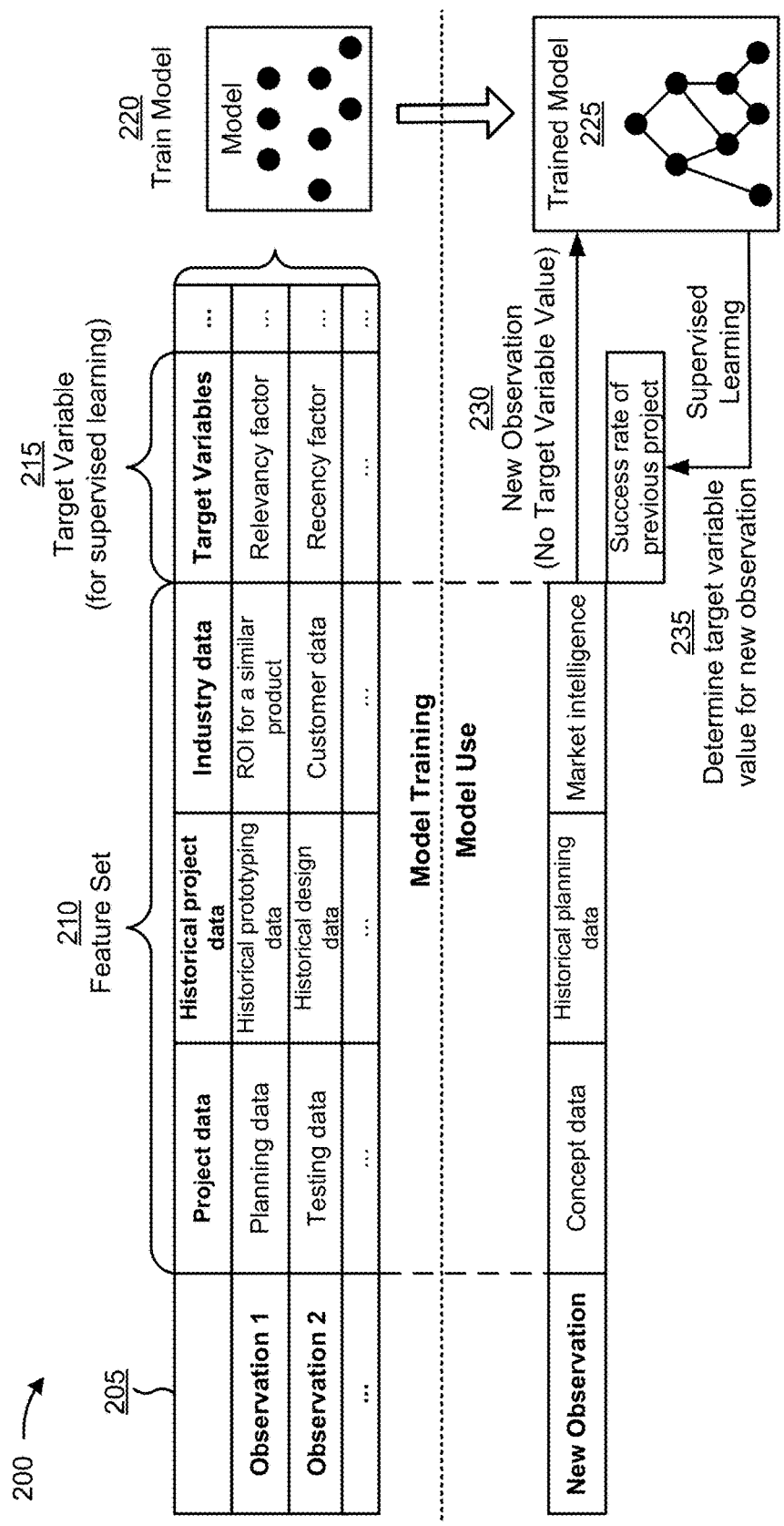
FIG. 2 is a diagram illustrating an example of training a machine learning model and applying a trained machine learning model to a new observation.

FIG. 2 is a diagram illustrating an example 200 of training and using a machine learning model in connection with determining the one or more variables for a predictive model. The machine learning model training and usage described herein may be performed using a machine learning system. The machine learning system may include or may be included in a computing device, a server, a cloud computing environment, and/or the like, such as the new product development system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the one or more client devices, the one or more server devices, and/or the new product development system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the one or more client devices, the one or more server devices, and/or the new product development system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of project data (e.g., project data associated with a prior project), a second feature of historical project data, a third feature of industry data (e.g., particular industry data associated with the prior product), and so on. As shown, for a first observation, the first feature may have a value of planning data, the second feature may have a value of historical prototyping data, the third feature may have a value of return on investment (ROI) for a similar product, and so on. These features and feature values are provided as examples, and may differ in other examples.

As shown by reference number 215, the set of observations may be associated with a target variable (e.g., to be used to by the predictive model). The target variable may have a numeric value, may have a numeric value that falls within a range of values or has some discrete possible values, may be selectable from one of multiple options (e.g., one of multiples classes, classifications, labels, and/or the like), may have a Boolean value, and/or the like. A target variable may be associated with a value, and a value may be specific to an observation. In example 200, the target variable has a relevancy factor value for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of concept data (e.g., for a new product), a second feature of historical planning data, a third feature of market intelligence (e.g., associated with the new product), and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a success rate of a previous project (e.g., for a previous product that is similar to the new product) value for the target variable for the new observation, as shown by reference number 235. Based on this prediction, the machine learning system may provide a recommendation, may provide output for determination of a recommendation, may perform an automated action, may cause an automated action to be performed (e.g., by instructing another device to perform the automated action), and/or the like. The automated action may include, for example, predicting a predicted success rate of the current project, as described herein.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determining one or more variables for the predictive model. The machine learning system enables recognition and/or identification of tens, hundreds, thousands, or millions of features and/or feature values for tens, hundreds, thousands, or millions of observations, thereby increasing accuracy and consistency and reducing delay associated with determining the one or more variables for the predictive model relative to requiring computing resources to be allocated for tens, hundreds, or thousands of operators to manually determine one or more variables for the predictive model using the features or feature values.

As indicated above, FIG. 2 is provided as an example. Other examples may differ from what is described in connection with FIG. 2.

Figure 3:
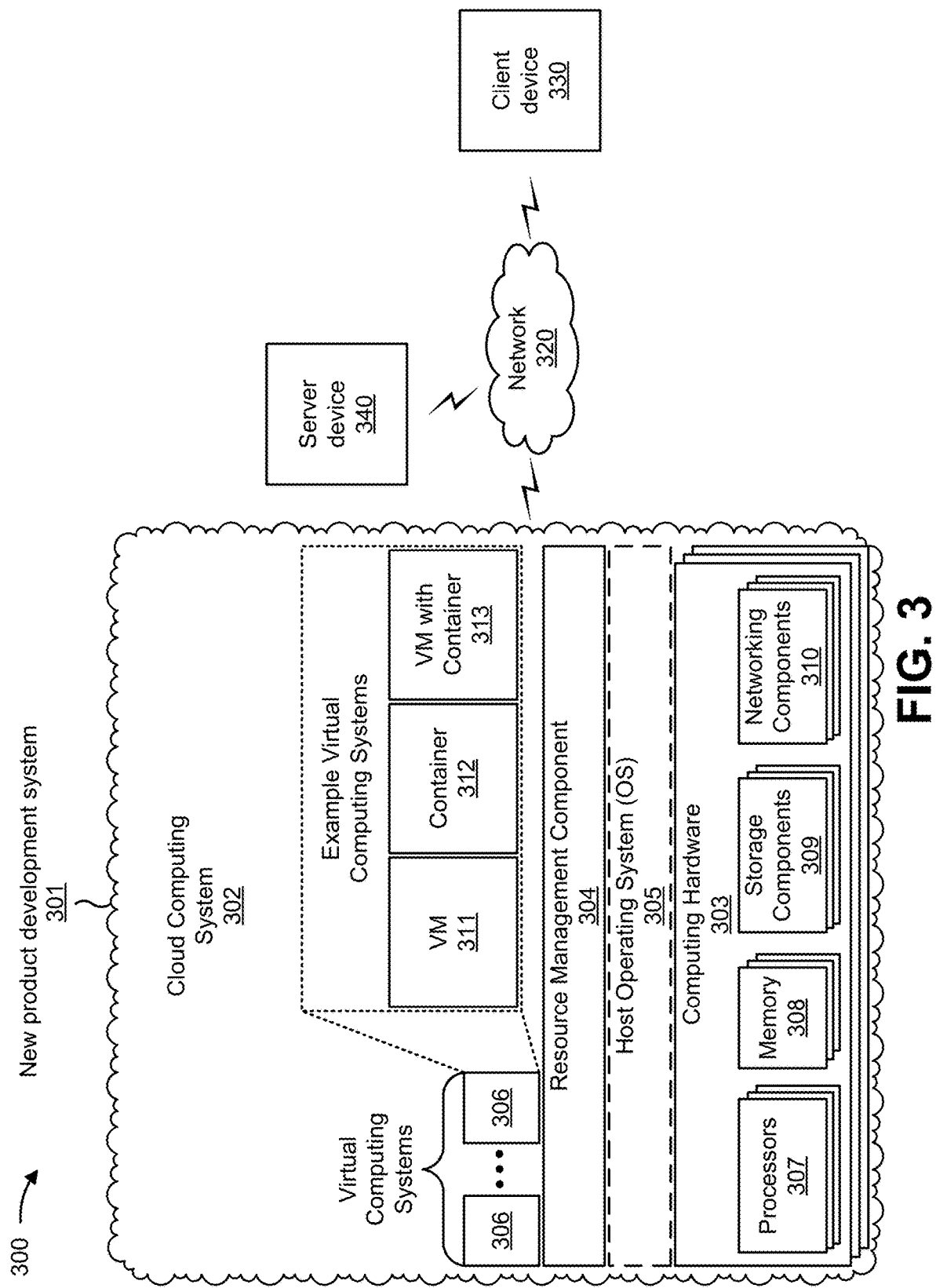
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a new product development system 301, which may include one or more elements of and/or may execute within a cloud computing system 302. The cloud computing system 302 may include one or more elements 303-313, as described in more detail below. As further shown in FIG. 3, environment 300 may include a network 320, a client device 330, and/or a server device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the new product development system 301 may include one or more elements 303-313 of the cloud computing system 302, may execute within the cloud computing system 302, and/or may be hosted within the cloud computing system 302, in some implementations, the new product development system 301 may not be cloud-based (e.g., may be implemented outside of a cloud computing system) or may be partially cloud-based. For example, the new product development system 301 may include one or more devices that are not part of the cloud computing system 302, such as device 400 of FIG. 4, which may include a stand-alone server or another type of computing device. The new product development system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

The client device 330 includes one or more devices capable of receiving, generating, storing, processing, and/or providing information, as described elsewhere herein. The client device 330 may include a communication device and/or a computing device. For example, the client device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The client device 330 may communicate with one or more other devices of environment 300, as described elsewhere herein. In some implementations, the client device 330 may use one or more tools provided by the new product development system 301 to facilitate development of a new product.

The server device 340 includes one or more devices capable of receiving, generating, storing, processing, providing, and/or routing information, as described elsewhere herein. The server device 340 may include a communication device and/or a computing device. For example, the server device 340 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The server device 340 may communicate with one or more other devices of environment 300, as described elsewhere herein. In some implementations, the server device 340 may use one or more tools provided by the new product development system 301 to facilitate development of a new product.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
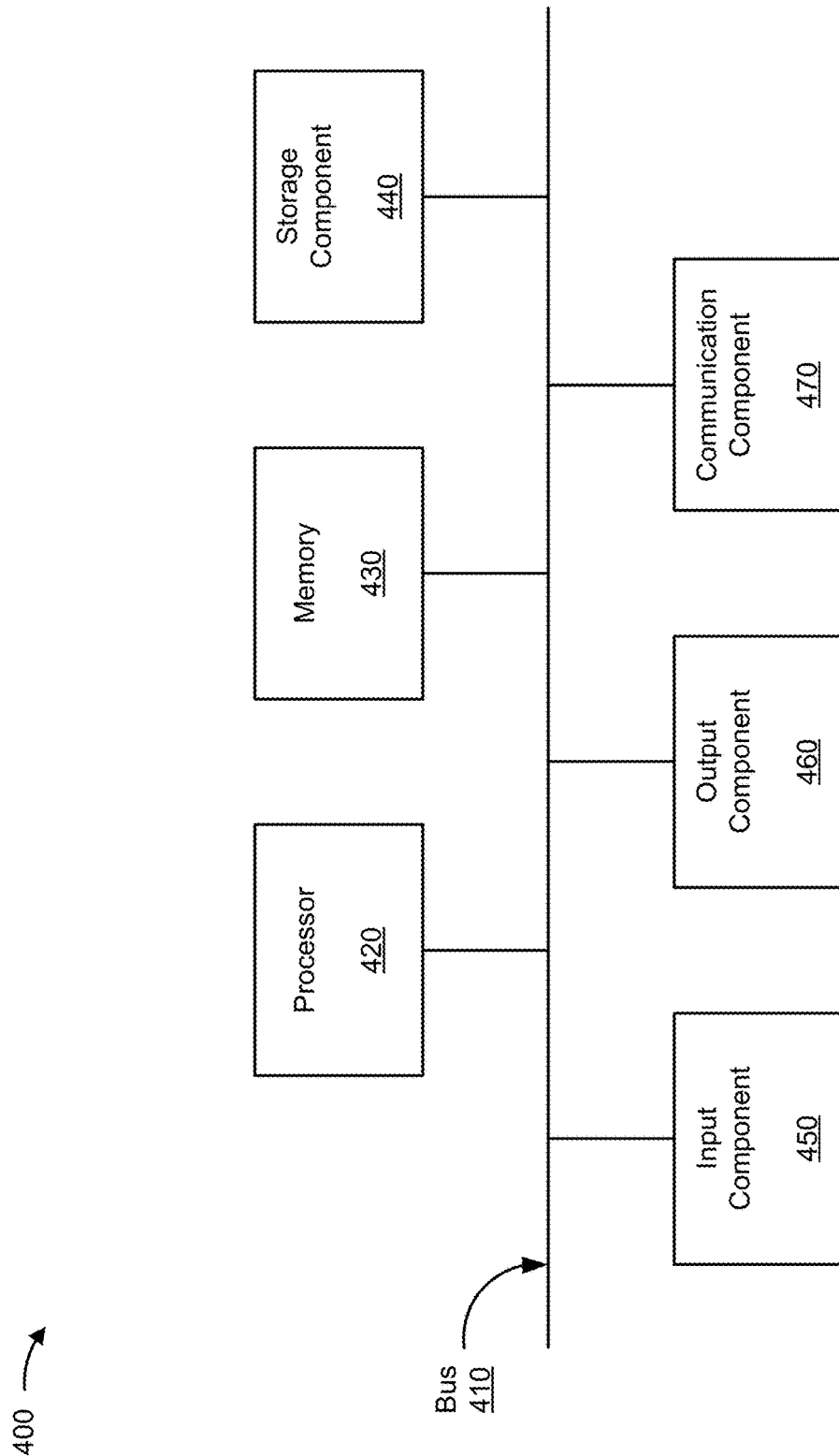
FIG. 4 is a diagram of example components of one or more devices of FIG. 3.

FIG. 4 is a diagram of example components of a device 400, which may correspond to new product development system 301, computing hardware 303, client device 330, and/or server device 340. In some implementations, new product development system 301, computing hardware 303, client device 330, and/or server device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
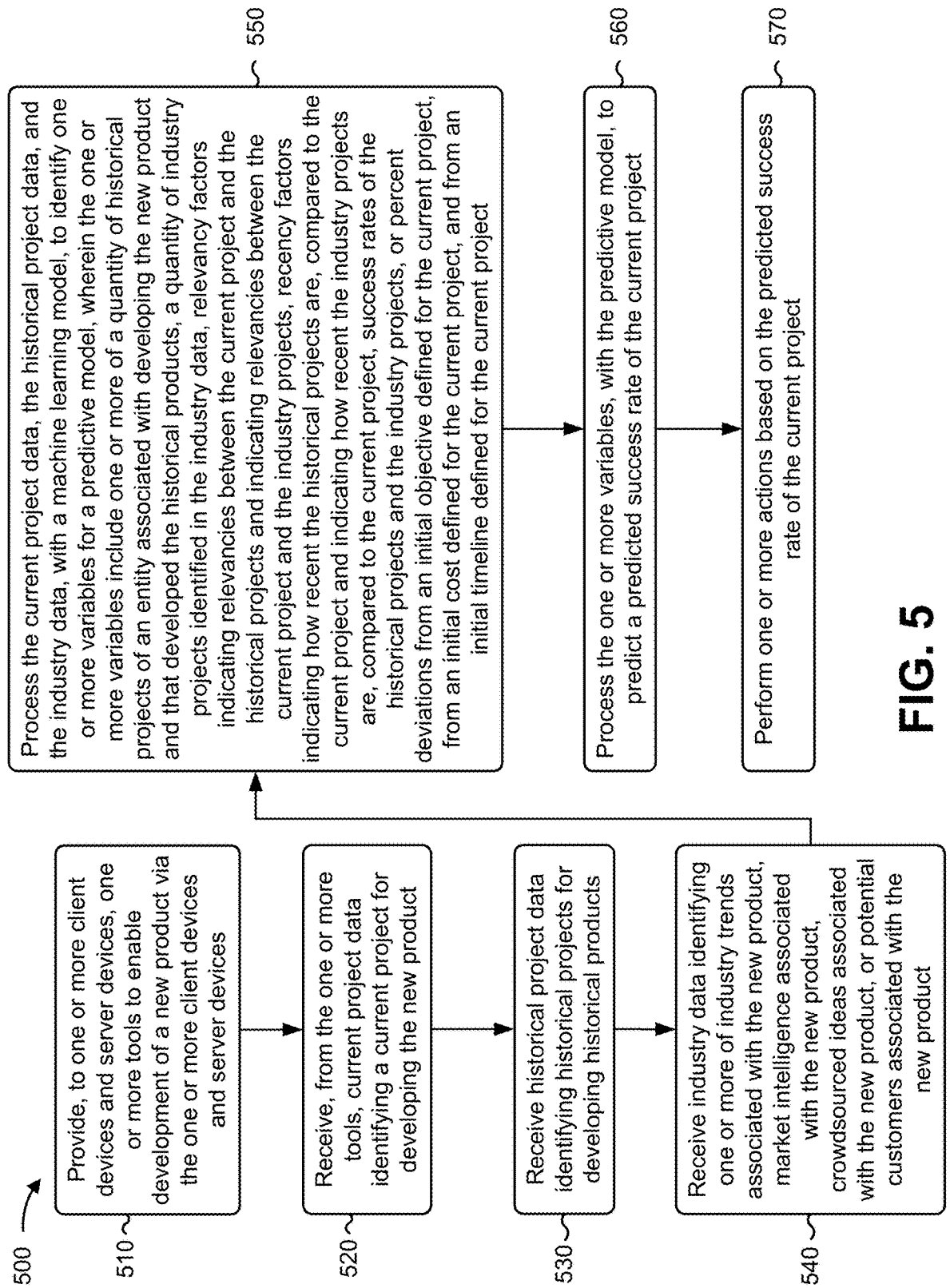
FIG. 5 is a flow chart of an example process relating to determining a predicted success rate of new product development.

FIG. 5 is a flowchart of an example process 500 associated with determining a predicted success of new product development. In some implementations, one or more process blocks of FIG. 5 may be performed by a device (e.g., new product development system 301). In some implementations, one or more process blocks of FIG. 5 may be performed by another device or a group of devices separate from or including the device, such as client device 330, server device 340, and/or the like. Additionally, or alternatively, one or more process blocks of FIG. 5 may be performed by one or more components of computing hardware 303, such as processors 307, memory 308, storage components 309, networking components 310, and/or the like; a device 400, such as processor 420, memory 430, storage component 440, input component 450, output component 460, communication component 470, and/or the like; and/or the like.

As shown in FIG. 5, process 500 may include providing, to one or more client devices and server devices, one or more tools to enable development of a new product via the one or more client devices and server devices (block 510). For example, the device may provide, to one or more client devices and server devices, one or more tools to enable development of a new product via the one or more client devices and server devices, as described above.

As further shown in FIG. 5, process 500 may include receiving, from the one or more tools, current project data identifying a current project for developing the new product (block 520). For example, the device may receive, from the one or more tools, current project data identifying a current project for developing the new product, as described above.

As further shown in FIG. 5, process 500 may include receiving historical project data identifying historical projects for developing historical products (block 530). For example, the device may receive historical project data identifying historical projects for developing historical products, as described above.

As further shown in FIG. 5, process 500 may include receiving industry data identifying one or more of industry trends associated with the new product, market intelligence associated with the new product, crowdsourced ideas associated with the new product, or potential customers associated with the new product (block 540). For example, the device may receive industry data identifying one or more of industry trends associated with the new product, market intelligence associated with the new product, crowdsourced ideas associated with the new product, or potential customers associated with the new product, as described above.

As further shown in FIG. 5, process 500 may include processing the current project data, the historical project data, and the industry data, with a machine learning model, to identify one or more variables for a predictive model, wherein the one or more variables include one or more of a quantity of historical projects of an entity associated with developing the new product and that developed the historical products, a quantity of industry projects identified in the industry data, relevancy factors indicating relevancies between the current project and the historical projects and indicating relevancies between the current project and the industry projects, recency factors indicating how recent the historical projects are, compared to the current project and indicating how recent the industry projects are, compared to the current project, success rates of the historical projects and the industry projects, or percent deviations from an initial objective defined for the current project, from an initial cost defined for the current project, and from an initial timeline defined for the current project (block 550). For example, the device may process the current project data, the historical project data, and the industry data, with a machine learning model, to identify one or more variables for a predictive model. In some implementations, the one or more variables include one or more of a quantity of historical projects of an entity associated with developing the new product and that developed the historical products, a quantity of industry projects identified in the industry data, relevancy factors indicating relevancies between the current project and the historical projects and indicating relevancies between the current project and the industry projects, recency factors indicating how recent the historical projects are, compared to the current project and indicating how recent the industry projects are, compared to the current project, success rates of the historical projects and the industry projects, or percent deviations from an initial objective defined for the current project, from an initial cost defined for the current project, and from an initial timeline defined for the current project.

As further shown in FIG. 5, process 500 may include processing the one or more variables, with the predictive model, to predict a predicted success rate of the current project (block 560). For example, the device may process the one or more variables, with the predictive model, to predict a predicted success rate of the current project, as described above.

As further shown in FIG. 5, process 500 may include performing one or more actions based on the predicted success rate of the current project (block 570). For example, the device may one or more actions based on the predicted success rate of the current project, as described above.

In a first implementation, receiving the current project data comprises one or more of receiving concept development data associated with the new product; receiving planning data associated with the new product; receiving design data associated with the new product; receiving prototyping data associated with the new product; receiving testing data associated with the new product; or receiving pilot launch data associated with the new product.

In a second implementation, alone or in combination with the first implementation, the historical project data includes historical project data of an entity associated with developing the new product and that developed the historical products.

In a third implementation, alone or in combination with one or more of the first and second implementations, processing the current project data, the historical project data, and the industry data, with the machine learning model, to identify the one or more variables for the predictive model comprises processing the current project data, the historical project data, and the industry data, with the machine learning model, to identify one or more of: a quantity of historical projects of an entity associated with developing the new product and that developed the historical products, a quantity of industry projects identified in the industry data, relevancy factors indicating relevancies between the current project and the historical projects and relevancies between the current project and the industry projects, recency factors indicating how recent the historical projects are, compared to the current project, and how recent the industry projects are, compared to the current project, success rates of the historical projects, success rates of the industry projects, a percent deviation from an initial objective defined for the current project, a percent deviation from an initial cost defined for the current project, or a percent deviation from an initial timeline defined for the current project.

In a fourth implementation, alone or in combination with one or more of the first through third implementations, processing the one or more variables, with the predictive model, to predict the predicted success rate of the current project comprises processing, with the predictive model, one or more of: a quantity of historical projects of an entity associated with developing the new product and that developed the historical products, a quantity of industry projects identified in the industry data, relevancy factors indicating relevancies between the current project and the historical projects and relevancies between the current project and the industry projects, recency factors indicating how recent the historical projects are, compared to the current project, and how recent the industry projects are, compared to the current project, success rates of the historical projects, success rates of the industry projects, a percent deviation from an initial objective defined for the current project, a percent deviation from an initial cost defined for the current project, or a percent deviation from an initial timeline defined for the current project, to predict the predicted success rate of the current project.

In a fifth implementation, alone or in combination with one or more of the first through fourth implementations, performing the one or more actions comprises one or more of providing, for display, information identifying the predicted success rate of the current project; determining a change for the current project based on the predicted success rate, and causing the change to be implemented via the one or more tools; or implementing an action plan for the current project based on the predicted success rate, and monitoring execution of the action plan.

In a sixth implementation, alone or in combination with one or more of the first through fifth implementations, performing the one or more actions comprises one or more of calculating, and providing for display, information identifying a return on investment for the current project based on the predicted success rate; determining a return on investment recommendation for the current project based on the predicted success rate, and causing the return on investment recommendation to be implemented via the one or more tools; or retraining the machine learning model based on the predicted success rate.

In a seventh implementation, alone or in combination with one or more of the first through sixth implementations, the one or more tools include one or more of cost and resource optimization tools, project roadmap and scheduling tools, or planning, selection, and prioritization tools.

In an eighth implementation, alone or in combination with one or more of the first through seventh implementations, performing the one or more actions includes determining one or more changes for the current project based on the predicted success rate; causing the one or more changes to be implemented via the one or more tools; determining an updated predicted success rate of the current project based on causing the one or more changes to be implemented; and performing one or more additional actions based on the updated predicted success rate of the current project.

In a ninth implementation, alone or in combination with one or more of the first through eighth implementations, processing the one or more variables, with the predictive model, to predict the predicted success rate of the current project includes determining a quantity of historical projects of an entity associated with developing the new product and that developed the historical products; determining a quantity of industry projects identified in the industry data; determining historical relevancy factors indicating relevancies between the current project and the historical projects; determining industry relevancy factors indicating relevancies between the current project and the industry projects; determining historical recency factors indicating how recent the historical projects are, compared to the current project; determining industry recency factors indicating how recent the industry projects are, compared to the current project; determining first success rates of the historical projects; determining second success rates of the industry projects; determining a first percent deviation from an initial objective defined for the current project; determining a second percent deviation from an initial cost defined for the current project; determining a third percent deviation from an initial timeline defined for the current project; and calculating the predicted success rate of the current project based on the quantity of historical projects, the quantity of industry projects, the historical relevancy factors, the industry relevancy factors, the historical recency factors, the industry recency factors, the first success rates, the second success rates, the first percent deviation, the second percent deviation, and the third percent deviation.

In a tenth implementation, alone or in combination with one or more of the first through ninth implementations, performing the one or more actions includes determining one or more changes for the current project based on the predicted success rate; causing the one or more changes to be implemented via the one or more tools; monitoring whether implementation of the one or more changes satisfies a compliance threshold; and generating, and providing for display, an alarm message when implementation of the one or more changes fails to satisfy the compliance threshold.

In an eleventh implementation, alone or in combination with one or more of the first through tenth implementations, the one or more tools include one or more of a cross-process linkage tool, a scenario modeling tool, a benchmarking tool, a what if workflow tool, a budget simulation tool, an alarm generation tool, a reporting tool, a bottleneck identification tool, or a root cause analysis tool.

In a twelfth implementation, alone or in combination with one or more of the first through eleventh implementations, performing the one or more actions includes ceasing implementation of the current project based on the predicted success rate; modifying implementation of the current project based on the predicted success rate; or continuing implementation of the current project based on the predicted success rate.

In a thirteenth implementation, alone or in combination with one or more of the first through twelfth implementations, the one or more variables include one or more of a quantity of historical projects of an entity associated with developing the new product and that developed the historical products, a quantity of industry projects identified in the industry data, relevancy factors indicating relevancies between the current project and the historical projects and relevancies between the current project and the industry projects, recency factors indicating how recent the historical projects are, compared to the current project, and how recent the industry projects are, compared to the current project, success rates of the historical projects, success rates of the industry projects, a percent deviation from an initial objective defined for the current project, a percent deviation from an initial cost defined for the current project, or a percent deviation from an initial timeline defined for the current project.

In a fourteenth implementation, alone or in combination with one or more of the first through thirteenth implementations, performing the one or more actions includes: providing, for display, information identifying the predicted success rate of the current project; determining a change for the current project based on the predicted success rate, and causing the change to be implemented via the one or more tools; implementing an action plan for the current project based on the predicted success rate, and monitoring execution of the action plan; calculating, and providing for display, information identifying a return on investment for the current project based on the predicted success rate; determining a return on investment recommendation for the current project based on the predicted success rate, and causing the return on investment recommendation to be implemented via the one or more tools; or retraining the machine learning model based on the predicted success rate.

In a fifteenth implementation, alone or in combination with one or more of the first through fourteenth implementations, performing the one or more actions includes determining one or more changes for the current project based on the predicted success rate; causing the one or more changes to be implemented via the one or more tools; determining an updated predicted success rate of the current project based on causing the one or more changes to be implemented; and performing one or more additional actions based on the updated predicted success rate of the current project.

In a sixteenth implementation, alone or in combination with one or more of the first through fifteenth implementations, processing the one or more variables, with the predictive model, to predict the predicted success rate of the current project includes determining a quantity of historical projects of an entity associated with developing the new product and that developed the historical products; determining a quantity of industry projects identified in the industry data; determining historical relevancy factors indicating relevancies between the current project and the historical projects; determining industry relevancy factors indicating relevancies between the current project and the industry projects; determining historical recency factors indicating how recent the historical projects are, compared to the current project; determining industry recency factors indicating how recent the industry projects are, compared to the current project; determining first success rates of the historical projects; determining second success rates of the industry projects; determining a first percent deviation from an initial objective defined for the current project; determining a second percent deviation from an initial cost defined for the current project; determining a third percent deviation from an initial timeline defined for the current project; and calculating the predicted success rate of the current project based on the quantity of historical projects, the quantity of industry projects, the historical relevancy factors, the industry relevancy factors, the historical recency factors, the industry recency factors, the first success rates, the second success rates, the first percent deviation, the second percent deviation, and the third percent deviation.

In a seventeenth implementation, alone or in combination with one or more of the first through sixteenth implementations, performing the one or more actions includes ceasing implementation of the current project based on the predicted success rate; modifying implementation of the current project based on the predicted success rate; or continuing implementation of the current project based on the predicted success rate.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   providing, by a device and to one or more client devices and server devices, one or more tools to enable development of a new product via the one or more client devices and server devices,
      wherein the one or more tools are used by the one or more client devices and server devices to develop the new product and include one or more of:
         cost and resource optimization tools,
         project roadmap and scheduling tools, or
         planning, selection, and prioritization tools;
   receiving, by the device and from the one or more tools, current project data identifying a current project for developing the new product;
   receiving, by the device, historical project data identifying historical projects for developing historical products;
   receiving, by the device, industry data identifying one or more of:
      industry trends associated with the new product,
      market intelligence associated with the new product,
      crowdsourced ideas associated with the new product, or
      potential customers associated with the new product;
   processing, by the device, the current project data, the historical project data, and the industry data, with a machine learning model, to identify one or more variables for a predictive model,
      wherein the one or more variables include:
         a quantity of historical projects of an entity associated with developing the new product and that developed the historical products,
         a quantity of industry projects identified in the industry data,
         success rates of the historical projects and success rates of the industry projects, and
         percent deviations from an initial objective defined for the current project, from an initial cost defined for the current project, and from an initial timeline defined for the current project;
   processing, by the device and based on determining the one or more variables, the one or more variables, with the predictive model, to predict a predicted success rate of the current project based on a formula utilizing a combination of relevancy factors and recency factors with the one or more variables,
      wherein the relevancy factors indicate relevancies between the current project and the historical projects and indicate relevancies between the current project and the industry projects,
      wherein the recency factors indicate how recent the historical projects are compared to the current project and indicate how recent the industry projects are compared to the current project, and
      wherein the formula is associated with determining a weighted average of the one or more variables,
         wherein the recency factors and the relevancy factors are used as a first product with the success rates of the historical projects and as a second product with the success rates of the industry projects to determine the weighted average;
   performing, by the device, one or more actions based on the predicted success rate of the current project,
      wherein the one or more actions comprise:
         determining one or more instructions associated with a change for the current project based on the predicted success rate,
         causing the change for the current project to be implemented via the one or more tools based on the one or more tools executing the one or more instructions,
         monitoring whether an implementation of the change satisfies a compliance threshold, and
         performing an additional action based on the change satisfying the compliance threshold;
   retraining, by the device, the machine learning model based on the predicted success rate of the current project; and
   predicting, by the device and using the retrained machine learning model, one or more other variables for the predictive model.

2. The method of claim 1, wherein receiving the current project data comprises one or more of:
   receiving concept development data associated with the new product;
   receiving planning data associated with the new product;
   receiving design data associated with the new product;
   receiving prototyping data associated with the new product;
   receiving testing data associated with the new product; or
   receiving pilot launch data associated with the new product.

3. The method of claim 1, wherein the historical project data includes historical project data of an entity associated with developing the new product and that developed the historical products.

4. The method of claim 1, wherein processing the current project data, the historical project data, and the industry data, with the machine learning model, to identify the one or more variables for the predictive model comprises:
   processing the current project data, the historical project data, and the industry data, with the machine learning model, to identify one or more of:
      a quantity of historical projects of an entity associated with developing the new product and that developed the historical products,
      a quantity of industry projects identified in the industry data,
      relevancy factors indicating relevancies between the current project and the historical projects and relevancies between the current project and the industry projects, recency factors indicating how recent the historical projects are, compared to the current project, and how recent the industry projects are, compared to the current project,
success rates of the historical projects,
success rates of the industry projects,
a percent deviation from an initial objective defined for the current project,
a percent deviation from an initial cost defined for the current project, or
a percent deviation from an initial timeline defined for the current project.

5. The method of claim 1, wherein processing the one or more variables, with the predictive model, to predict the predicted success rate of the current project comprises:
processing, with the predictive model, one or more of:
a quantity of historical projects of an entity associated with developing the new product and that developed the historical products,
a quantity of industry projects identified in the industry data,
the relevancy factors,
the recency factors,
success rates of the historical projects,
success rates of the industry projects,
a percent deviation from an initial objective defined for the current project,
a percent deviation from an initial cost defined for the current project, or
a percent deviation from an initial timeline defined for the current project, to predict the predicted success rate of the current project.

6. The method of claim 1, wherein performing the one or more actions comprises one or more of:
providing, for display, information identifying the predicted success rate of the current project;
determining the change for the current project based on the predicted success rate, and causing the change to be implemented via the one or more tools; or
implementing an action plan for the current project based on the predicted success rate, and monitoring execution of the action plan.

7. The method of claim 1, wherein performing the one or more actions comprises one or more of:
calculating, and providing for display, information identifying a return on investment for the current project based on the predicted success rate;
determining a return on investment recommendation for the current project based on the predicted success rate, and causing the return on investment recommendation to be implemented via the one or more tools; or
retraining the machine learning model based on the predicted success rate.

8. A device, comprising:
one or more memories; and
one or more processors, communicatively coupled to the one or more memories, configured to:
provide, to one or more client devices and server devices, one or more tools to enable development of a new product via the one or more client devices and server devices,
wherein the one or more tools are used by the one or more client devices and server devices to develop the new product and include one or more of:
cost and resource optimization tools,
project roadmap and scheduling tools, or
planning, selection, and prioritization tools;
receive, from the one or more tools, current project data identifying a current project for developing the new product;
receive historical project data identifying historical projects for developing historical products;
receive industry data associated with the new product;
process the current project data, the historical project data, and the industry data, with a machine learning model, to identify one or more variables for a predictive model,
wherein the machine learning model is trained based on:
prior project data identifying a prior project for developing a prior product,
the historical project data, and
particular industry data associated with the prior product;
process, based on determining the one or more variables, the one or more variables, with the predictive model, to predict a predicted success rate of the current project based on a formula utilizing a combination of relevancy factors and recency factors with the one or more variables,
wherein the relevancy factors indicate relevancies between the current project and the historical projects and indicate relevancies between the current project and the industry projects,
wherein the recency factors indicate how recent the historical projects are compared to the current project and indicate how recent the industry projects are compared to the current project, and
wherein the formula is associated with determining a weighted average of the one or more variables,
wherein the recency factors and the relevancy factors are used as a first product with success rates of the historical projects and as a second product with success rates of the industry projects to determine the weighted average;
perform one or more actions based on the predicted success rate of the current project,
wherein the one or more actions comprise:
determining one or more instructions associated with a change for the current project based on the predicted success rate,
causing the change for the current project to be implemented via the one or more tools based on the one or more tools executing the one or more instructions,
monitoring whether an implementation of the change satisfies a compliance threshold, and
performing an additional action based on the change satisfying the compliance threshold;
retrain the machine learning model based on the predicted success rate of the current project; and
predict, using the retrained machine learning model, one or more other variables for the predictive model.

9. The device of claim 8, wherein the one or more tools include:
the cost and resource optimization tools,
the project roadmap and scheduling tools, and
the planning, selection, and prioritization tools.

10. The device of claim 8, wherein the one or more processors, when performing the one or more actions, are configured to:
determine one or more changes for the current project based on the predicted success rate;

cause the one or more changes to be implemented via the one or more tools;
determine an updated predicted success rate of the current project based on causing the one or more changes to be implemented; and
perform one or more additional actions based on the updated predicted success rate of the current project.

11. The device of claim 8, wherein the one or more processors, when processing the one or more variables, with the predictive model, to predict the predicted success rate of the current project, are configured to:
determine a quantity of historical projects of an entity associated with developing the new product and that developed the historical products;
determine a quantity of industry projects identified in the industry data;
determine historical relevancy factors indicating relevancies between the current project and the historical projects;
determine industry relevancy factors indicating relevancies between the current project and the industry projects;
determine historical recency factors indicating how recent the historical projects are, compared to the current project;
determine industry recency factors indicating how recent the industry projects are, compared to the current project;
determine first success rates of the historical projects;
determine second success rates of the industry projects;
determine a first percent deviation from an initial objective defined for the current project;
determine a second percent deviation from an initial cost defined for the current project;
determine a third percent deviation from an initial timeline defined for the current project; and
calculate the predicted success rate of the current project based on the quantity of historical projects, the quantity of industry projects, the historical relevancy factors, the industry relevancy factors, the historical recency factors, the industry recency factors, the first success rates, the second success rates, the first percent deviation, the second percent deviation, and the third percent deviation.

12. The device of claim 8, wherein the one or more processors, when performing the additional action, are configured to:
generate, and provide for display, an alarm message when implementation of the one or more changes fails to satisfy the compliance threshold.

13. The device of claim 8, wherein the one or more tools include one or more of:
a cross-process linkage tool,
a scenario modeling tool,
a benchmarking tool,
a what if workflow tool,
a budget simulation tool,
an alarm generation tool,
a reporting tool,
a bottleneck identification tool, or
a root cause analysis tool.

14. The device of claim 8, wherein the one or more processors, when performing the one or more actions, are configured to one of:
cease implementation of the current project based on the predicted success rate;
modify implementation of the current project based on the predicted success rate; or
continue implementation of the current project based on the predicted success rate.

15. A non-transitory computer-readable medium storing instructions, the instructions comprising:
one or more instructions that, when executed by one or more processors, cause the one or more processors to:
provide, to one or more client devices and server devices, one or more tools to enable development of a new product via the one or more client devices and server devices;
receive, from the one or more tools, current project data identifying a current project for developing the new product;
receive historical project data identifying historical projects for developing historical products;
receive industry data associated with the new product identifying industry projects;
process the current project data, the historical project data, and the industry data, with a machine learning model, to identify one or more variables for a predictive model;
process the one or more variables, with the predictive model, to predict a predicted success rate of the current project based on a formula utilizing a combination of relevancy factors and recency factors with the one or more variables,
wherein the relevancy factors indicate relevancies between the current project and the historical projects and indicate relevancies between the current project and the industry projects,
wherein the recency factors indicate how recent the historical projects are compared to the current project and indicate how recent the industry projects are compared to the current project, and
wherein the formula is associated with determining a weighted average of the one or more variables,
wherein the recency factors and the relevancy factors are used as a first product with success rates of the historical projects and as a second product with success rates of the industry projects to determine the weighted average;
retrain the machine learning model based on the predicted success rate of the current project;
process, using the machine learning model, the current project data, the historical project data, and the industry data to predict additional variables for the predictive model; and
perform one or more actions based on the predicted success rate of the current project,
wherein the one or more actions comprise:
determining additional instructions associated with a change for the current project based on the predicted success rate,
causing the change for the current project to be implemented via the one or more tools based on the one or more tools executing the additional instructions,
monitoring whether the implementation of the change satisfies a compliance threshold, and
performing an additional action based on the change satisfying the compliance threshold;
retrain the machine learning model based on the predicted success rate of the current project; and
predict, using the retrained machine learning model, one or more other variables for the predictive model.

16. The non-transitory computer-readable medium of claim 15, wherein the one or more variables include one or more of:
- a quantity of historical projects of an entity associated with developing the new product and that developed the historical products,
- a quantity of industry projects identified in the industry data,
- success rates of the historical projects,
- success rates of the industry projects,
- a percent deviation from an initial objective defined for the current project,
- a percent deviation from an initial cost defined for the current project, or
- a percent deviation from an initial timeline defined for the current project.

17. The non-transitory computer-readable medium of claim 15, wherein the one or more instructions, that cause the one or more processors to perform the one or more actions, cause the one or more processors to one or more of:
- provide, for display, information identifying the predicted success rate of the current project;
- determine the change for the current project based on the predicted success rate;
- implement an action plan for the current project based on the predicted success rate, and monitor execution of the action plan;
- calculate, and provide for display, information identifying a return on investment for the current project based on the predicted success rate;
- determine a return on investment recommendation for the current project based on the predicted success rate, and cause the return on investment recommendation to be implemented via the one or more tools; or
- retrain the machine learning model based on the predicted success rate.

18. The non-transitory computer-readable medium of claim 15, wherein the one or more instructions, that cause the one or more processors to perform the one or more actions, cause the one or more processors to:
- determine one or more changes for the current project based on the predicted success rate;
- cause the one or more changes to be implemented via the one or more tools;
- determine an updated predicted success rate of the current project based on causing the one or more changes to be implemented; and
- perform one or more additional actions based on the updated predicted success rate of the current project.

19. The non-transitory computer-readable medium of claim 15, wherein the one or more instructions, that cause the one or more processors to process the one or more variables, with the predictive model, to predict the predicted success rate of the current project, cause the one or more processors to:
- determine a quantity of historical projects of an entity associated with developing the new product and that developed the historical products;
- determine a quantity of industry projects identified in the industry data;
- determine historical relevancy factors indicating relevancies between the current project and the historical projects;
- determine industry relevancy factors indicating relevancies between the current project and the industry projects;
- determine historical recency factors indicating how recent the historical projects are, compared to the current project;
- determine industry recency factors indicating how recent the industry projects are, compared to the current project;
- determine first success rates of the historical projects;
- determine second success rates of the industry projects;
- determine a first percent deviation from an initial objective defined for the current project;
- determine a second percent deviation from an initial cost defined for the current project;
- determine a third percent deviation from an initial timeline defined for the current project; and
- calculate the predicted success rate of the current project based on the quantity of historical projects, the quantity of industry projects, the historical relevancy factors, the industry relevancy factors, the historical recency factors, the industry recency factors, the first success rates, the second success rates, the first percent deviation, the second percent deviation, and the third percent deviation.

20. The non-transitory computer-readable medium of claim 15, wherein the one or more instructions, that cause the one or more processors to perform the one or more actions, cause the one or more processors to one of:
- cease implementation of the current project based on the predicted success rate;
- modify implementation of the current project based on the predicted success rate; or
- continue implementation of the current project based on the predicted success rate.

* * * * *

UNITED STATES PATENT AND TRADEMARK OFFICE
CERTIFICATE OF CORRECTION

PATENT NO. : 12,033,097 B2  
APPLICATION NO. : 16/947551  
DATED : July 9, 2024  
INVENTOR(S) : Amit Kumar et al.

Page 1 of 1

It is certified that error appears in the above-identified patent and that said Letters Patent is hereby corrected as shown below:

In the Claims

- In Claim 1, Column 19, Line 61, delete "the one or more variables," between "variables," and "with";

- In Claim 8, Column 22, Line 20, delete "the one or more variables," between "variables," and "with".

Signed and Sealed this  
Seventeenth Day of December, 2024

Derrick Brent  
*Acting Director of the United States Patent and Trademark Office*